US007702451B1

(12) United States Patent
Crossley

(10) Patent No.: US 7,702,451 B1
(45) Date of Patent: Apr. 20, 2010

(54) PROGRAMMABLE ENGINE-START SYSTEM

(76) Inventor: Jeffrey Crossley, 1082 Joselson Ave., Bayshore, NY (US) 11706

( * ) Notice: Subject to any disclaimer, the term of this patent is extended or adjusted under 35 U.S.C. 154(b) by 214 days.

(21) Appl. No.: 11/868,477

(22) Filed: Oct. 6, 2007

(51) Int. Cl.

| | |
|---|---|
| ***G06F 19/00*** | (2006.01) |
| ***G08G 1/00*** | (2006.01) |
| ***F02N 15/10*** | (2006.01) |

(52) U.S. Cl. .................... 701/113; 701/112; 123/179.2; 123/179.4; 340/901

(58) Field of Classification Search ... 123/179.2–179.4, 123/198 D, 198 DB; 701/112, 113, 115; 307/10.1–10.7; 340/438, 439, 5.6, 425.5, 340/901
See application file for complete search history.

(56) References Cited

U.S. PATENT DOCUMENTS

| | | | | |
|---|---|---|---|---|
| 5,345,902 | A * | 9/1994 | Kalail et al. | 123/179.2 |
| 6,351,703 | B1 * | 2/2002 | Avery, Jr. | 701/112 |
| 6,363,906 | B1 * | 4/2002 | Thompson et al. | 123/198 DB |
| 6,860,248 | B1 * | 3/2005 | Mene | 123/179.2 |
| 6,982,632 | B2 * | 1/2006 | Nagasaka et al. | 340/438 |
| 7,036,477 | B1 * | 5/2006 | Thompson et al. | 123/179.4 |
| 7,171,300 | B1 * | 1/2007 | Anderson | 701/112 |
| 7,210,443 | B2 * | 5/2007 | Shimokawa et al. | 123/179.4 |
| 7,310,576 | B1 * | 12/2007 | Letang | 701/112 |
| 2008/0117079 | A1 * | 5/2008 | Hassan | 340/901 |

FOREIGN PATENT DOCUMENTS

| | | |
|---|---|---|
| JP | 60113040 A * | 6/1985 |

* cited by examiner

*Primary Examiner*—Willis R Wolfe, Jr.

(57) ABSTRACT

A programmable engine-start system which includes a controller for mounting on a dashboard and which includes an input device for inputting a start time, a clock for keeping accurate time, a safety circuit for shutting off the engine, a display panel for displaying engine start status, a first wiring between the controller and the ignition switch, and a second wiring between the controller and a battery source.

7 Claims, 2 Drawing Sheets

PROGRAMMABLE ENGINE-START SYSTEM

FIELD OF THE INVENTION

The present invention generally relates to an automobile accessory and more particularly, relates to a programmable engine-start system for use on a motor vehicle.

BACKGROUND OF THE INVENTION

The technique and device for remote stating of a motor vehicle have been around for a few years. It provides the convenience that a motor vehicle parked outside can be remotely started by an user situated inside a house or dwelling. It provides the benefit that in the wintertime, the engine of the motor vehicle can be warmed up and the passenger compartment can be pre-heated prior to entering the vehicle. In the summertime, the passenger compartment of the vehicle can first be cooled assuming that the air-conditioning was preset by the user prior to parking his or her vehicle. However, this type of remote starting utilizes a principal of either infrared transmission or ultrasonic transmission, i.e. both require that the user and the motor vehicle in a direct line of sight. In other words, the motor vehicle can only be started if the user was looking at the vehicle from inside a house or dwelling. Moreover, the remote starting only works for a maximum distance of about 50 feet. If the user is farther away than that distance, the remote start of the motor vehicle would not function. It is therefore desirable to provide a method of remote starting a motor vehicle when the user does not have a direct line of sight of the vehicle. It is also desirable to provide a method of remote starting a motor vehicle regardless how far the user is located from the vehicle.

It is therefore an object of the present invention to provide a remote starting apparatus for a motor vehicle that does not have the drawbacks or shortcomings of the conventional remote starting devices.

It is another object of the present invention to provide an automatic engine-start system for use on motor vehicles that is controlled by a timer clock.

It is a further object of the present invention to provide a programmable engine-start system for a motor vehicle that can start a vehicle at a predetermined time.

SUMMARY OF THE INVENTION

In accordance with the present invention, a programmable engine start system for motor vehicles is provided.

In a preferred embodiment, the present invention programmable engine-start system is constructed of a controller for mounting juxtaposed to a dashboard in a motor vehicle, the control further includes an input device for inputting a start time; a clock for keeping accurate time; a safety circuit for shutting-off the engine after the engine being started for at least 10 minutes; a display panel for displaying engine-start settings; a first wiring between the controller and an ignition switch of the motor vehicle; and a second wiring between the controller and a battery source of the motor vehicle.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
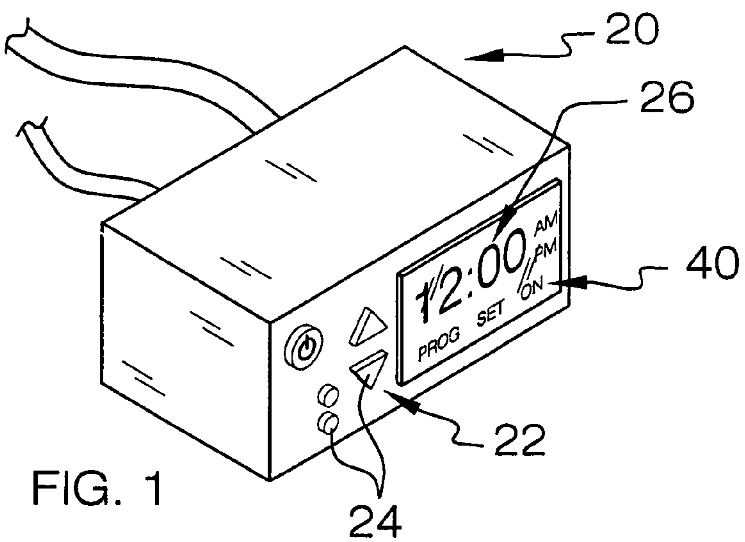
FIG. 1 is a perspective view of the present invention programmable engine-start system.

The present invention discloses a programmable engine-start system that can be used regardless how far the user is from the motor vehicle.

The present invention programmable engine start system for a motor vehicle is a programmable engine starting system that is most suitably used in either hot or cold climates. The timer-controlled system can automatically start the engine outside in the owner's absence so that the vehicle is ready to drive upon the owners arrival. It is especially helpful when parked outside in freezing winter weather by allowing the owner to return and enter a heated interior with the windows already defrosted. Similarly, the air conditioner can be running upon arrival at the vehicle when parked outside in the hot summer sun.

The present invention programmable engine-start system consists primarily of a programmable controller, engine ignition wiring harness, electronics, insolated wiring, and mounting hardware. The rectangular controller mounted on or near the dashboard contains small push-button keys for programming such as "time", "hour", "minute" and "set". Further included is a display screen for viewing and confirming information entered into the system memory.

The present invention timer can be set to start the engine prior to owner's arrival. If the individual left for work at 6:00 am every morning for example, the timer might be set to start the engine at 5:55 am. This would ensure the engine was at an operating temperature and the interior temperature of the vehicle adjusted to the owner's liking. Obviously, the heater or air conditioner controls on the dashboard must be preset along with the timer and other settings to provide the desired temperature adjustment in the owner's absence.

When the owner arrives at the vehicle, the key is inserted into the ignition switch and turned to start the engine. If the owner does not arrive at the parked vehicle and insert the ignition key after approximately 10 minutes, the system would shut-off the engine as a safety precaution.

The present invention programmable engine start system can be offered as standard or optional equipment with new production vehicles, while it can also be offered in an aftermarket form for retrofitting into cars and trucks.

The present invention programmable engine start system fulfills the need for timer-controlled engine starting. The appealing features of the present invention engine start-system are its ease of use, convenience, and hating/cooling capabilities. Instead of walking outside in the cold winter weather to start the car engine, it could be started automatically prior to owner's arrival so that the interior is already warm and comfortable. This would save time and effort especially for individuals living in apartment buildings and high rises. In the summertime, the motorists can enter a cool, dehumidified interior with the air conditioner already running. The present invention provides a clear advantage over the conventional remote engine starters by operating without direct line of sight or within a certain operational range.

Figure 2:
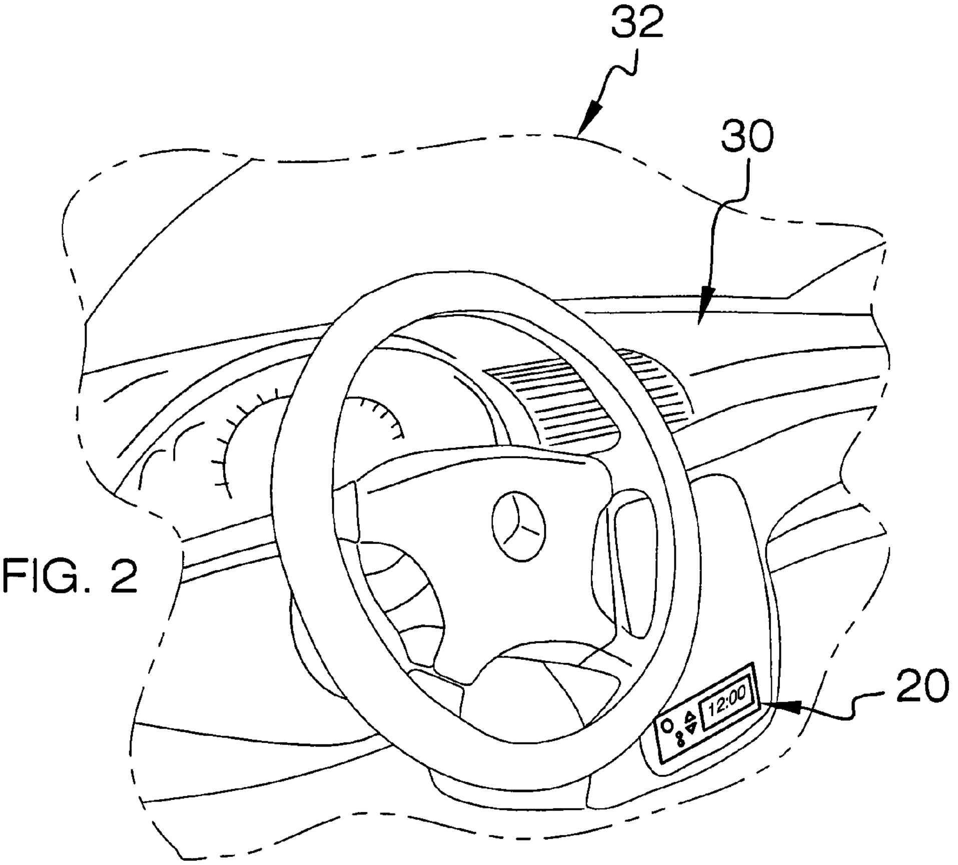
FIG. 2 is a perspective view of the present invention programmable engine-start system as installed on the dashboard of a motor vehicle.
Figure 3:
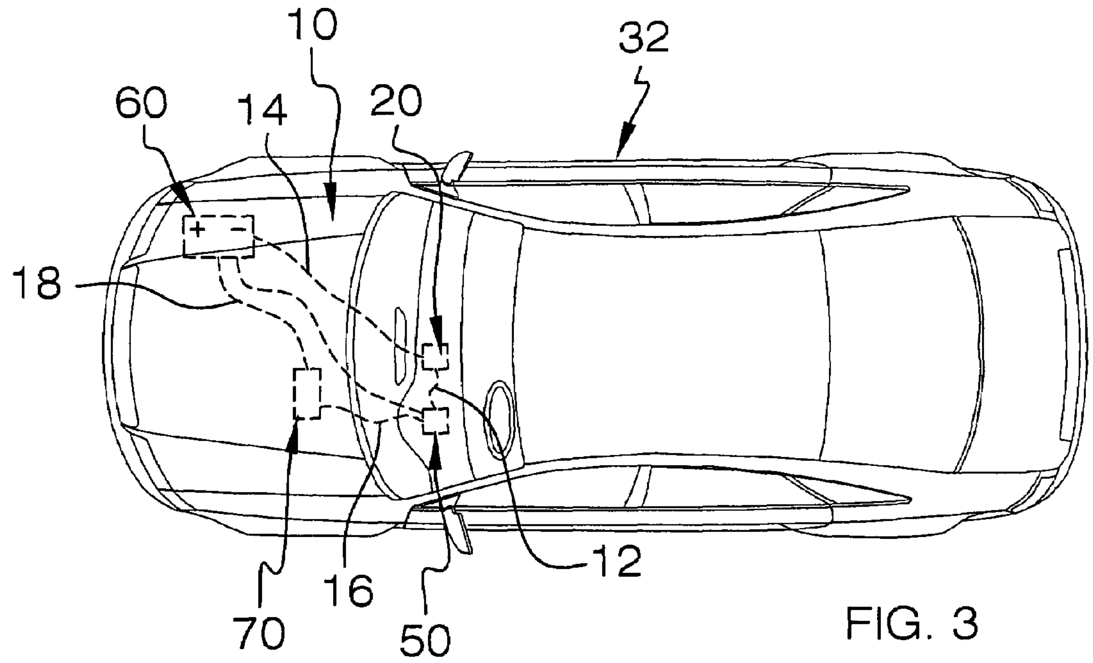
FIG. 3 is a top plan view of the present invention programmable engine-start system installed in an automobile.

Referring initially to FIGS. 1,2 and 3, wherein a perspective view of a controller 20 for a present invention programmable engine start system 10 is shown. The controller 20 is mounted juxtaposed to a dashboard 30, shown in FIG. 2, in a motor vehicle 32. The controller 20 which is programmable further includes a input device 22 such as push buttons 24 for inputting a start time; a clock 26 for keeping accurate time; a safety circuit 28 (FIG. 4) for shutting off the engine after the engine is started for at least 10 minutes; and a display panel 40 for displaying engine-start settings.

As shown in FIG. 3, the present invention programmable engine-start system 10 further includes a first wiring 12 between the controller 20 and an ignition switch 50 for the motor vehicle 32, and a second wiring 14 connecting between controller 20 and the battery 60 of the motor vehicle 32. The ignition switch 50 is further connected to the engine starter 70 through a third wiring 16 the battery 60 further supplies power to the engine starter 70 through a fourth wiring 18.

Figure 4:
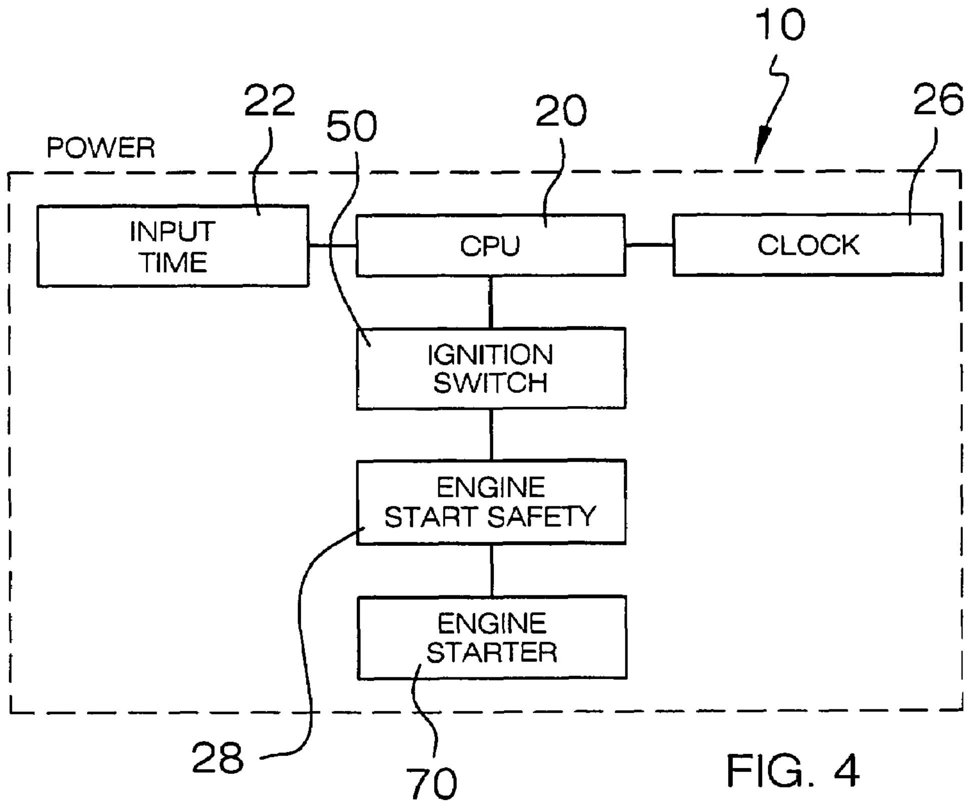
FIG. 4 is a functional block diagram for the present invention programmable engine-start system.

FIG. 4 is a functional block diagram for the present invention programmable engine start system 10 which includes the input device 22, the clock 26, the CPU or the controller 20, the ignition switch 50, the engine-start safety circuit 28 and the engine starter 70.

The present invention programmable engine-start system has therefore been amply described in the above descriptions and in the appended drawings of FIGS. 1-4.

While the preferred embodiments of the invention have been described above, it will be recognized and understood that various modifications can be made in the invention and the appended claims are intended to cover all such modifications which may fall within the spirit and scope of the invention.

What is claimed is:

1. A programmable engines-start system comprising:
- a controller for mounting juxtaposed to a dashboard in a motor vehicle, said controller further comprising;
  - an input device for inputting a start time;
  - a clock for keeping accurate time;
  - a safety circuit for shutting-off the engine after the engine being started for at least 10 minutes;
  - a display panel for displaying engine-start settings;
- a first wiring between said controller and an ignition switch of said motor vehicle; and
- a second wiring between said controller and a battery source of said motor vehicle.

2. The programmable engines-start system according to claim 1, wherein said controller is a central processing unit (CPU) that can be programmed.

3. The programmable engines-start system according to claim 1, wherein said input device is a keyboard.

4. The programmable engines-start system according to claim 1, wherein said input device consists of pushbuttons.

5. The programmable engines-start system according to claim 1, wherein said safety circuit shuts off the engine after the engine being started for at least 5 minutes.

6. The programmable engines-start system according to claim 1, wherein said display panel is a LCD panel.

7. The programmable engines-start system according to claim 1, wherein said battery source is a 12v DC battery.

* * * * *